United States Patent
Abe

(10) Patent No.: US 9,465,546 B2
(45) Date of Patent: Oct. 11, 2016

(54) MEMORY CONTROL METHOD, MEMORY CONTROL PROGRAM, AND SEMICONDUCTOR INTEGRATED CIRCUIT DEVICE

(71) Applicant: SOCIONEXT INC., Yokohama-shi, Kanagawa (JP)

(72) Inventor: Naoki Abe, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 76 days.

(21) Appl. No.: 14/512,172

(22) Filed: Oct. 10, 2014

(65) Prior Publication Data
US 2015/0199135 A1  Jul. 16, 2015

(30) Foreign Application Priority Data
Jan. 14, 2014  (JP) .................. 2014-004365

(51) Int. Cl.
*G06F 12/00* (2006.01)
*G06F 3/06* (2006.01)

(52) U.S. Cl.
CPC ........... *G06F 3/0611* (2013.01); *G06F 3/0659* (2013.01); *G06F 3/0679* (2013.01)

(58) Field of Classification Search
CPC ... G06F 3/0611; G06F 3/0679; G06F 3/0659
See application file for complete search history.

(56) References Cited

U.S. PATENT DOCUMENTS

2007/0011581 A1  1/2007  Nakanishi et al.

FOREIGN PATENT DOCUMENTS

JP  2006-318366 A  11/2006
JP  2008-117491 A  5/2008

*Primary Examiner* — John A Lane
(74) *Attorney, Agent, or Firm* — Arent Fox LLP

(57) ABSTRACT

A memory control method, which is configured to control data writing to a memory, includes securing a temporary write region in the memory; at the time of writing data to the memory, writing to the temporary write region based on a threshold time. The memory control method includes, when writing to a first portion of the temporary write region has not been completed by a time when the threshold time passed, canceling the writing to the first portion, and writing to a second portion that is different from the first portion of the temporary write region.

15 Claims, 14 Drawing Sheets

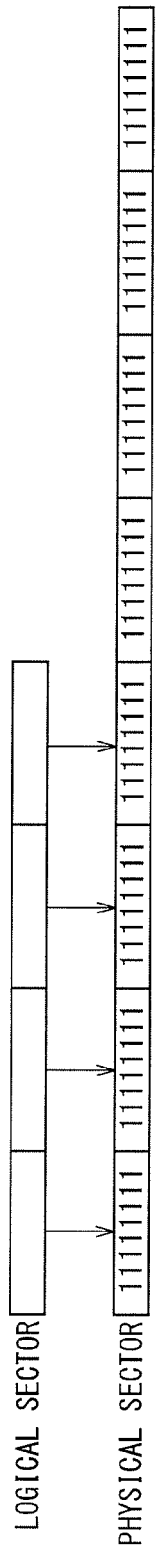
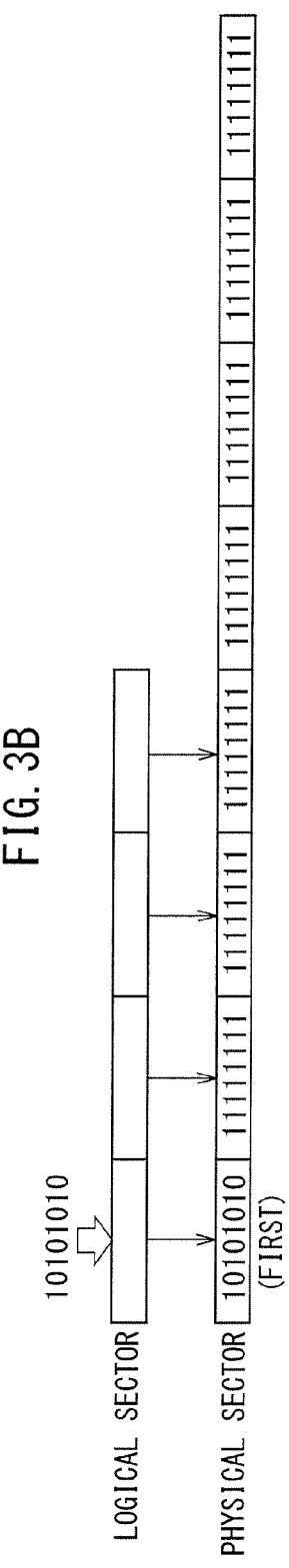
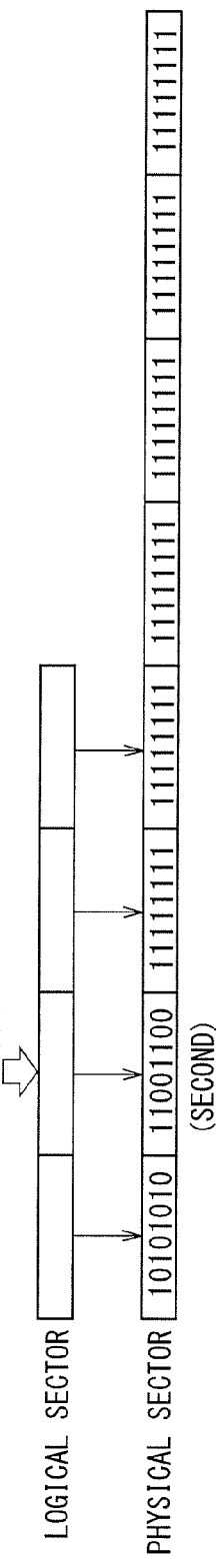

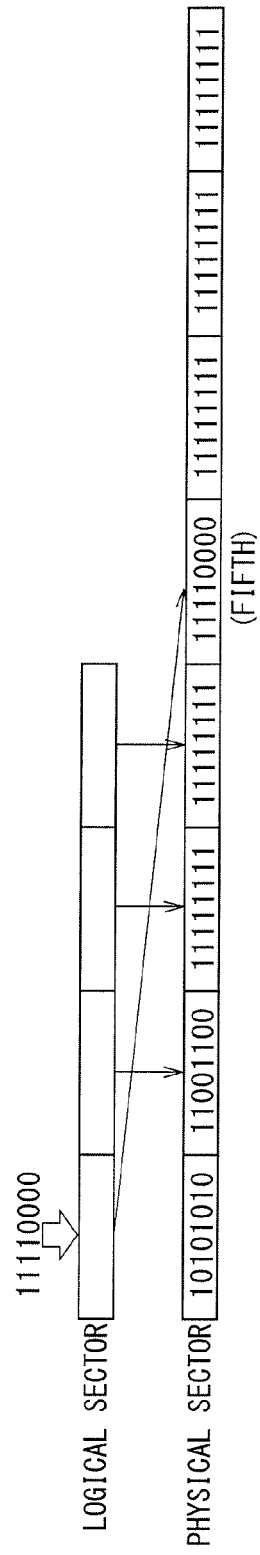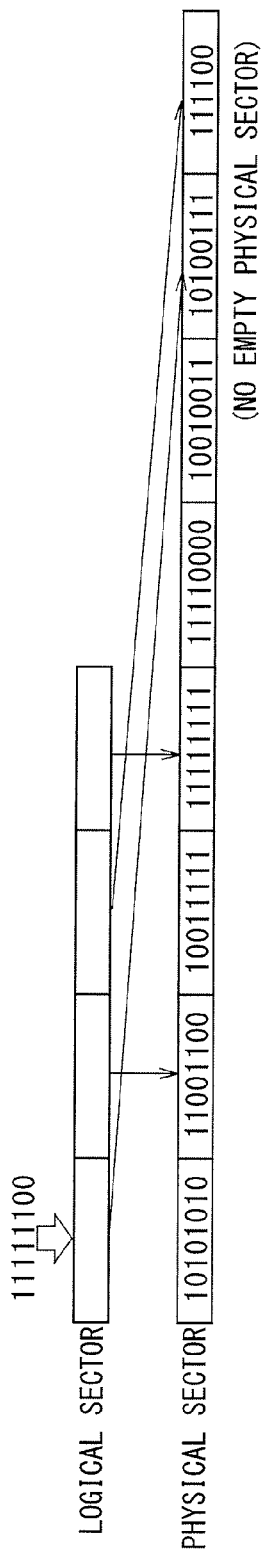

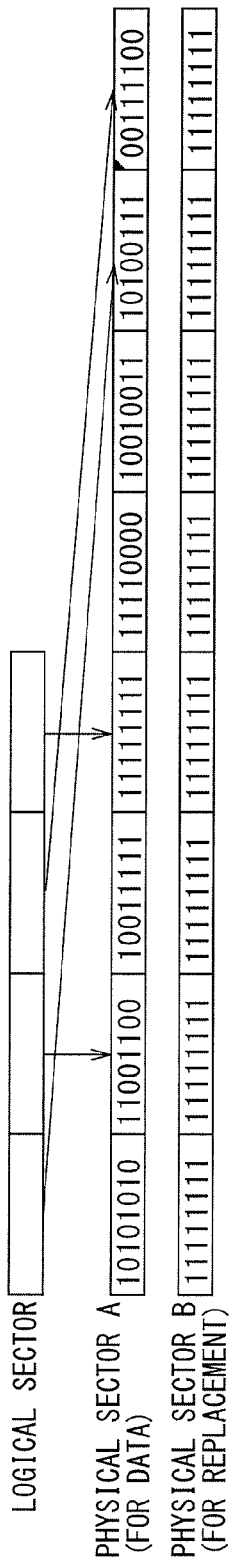
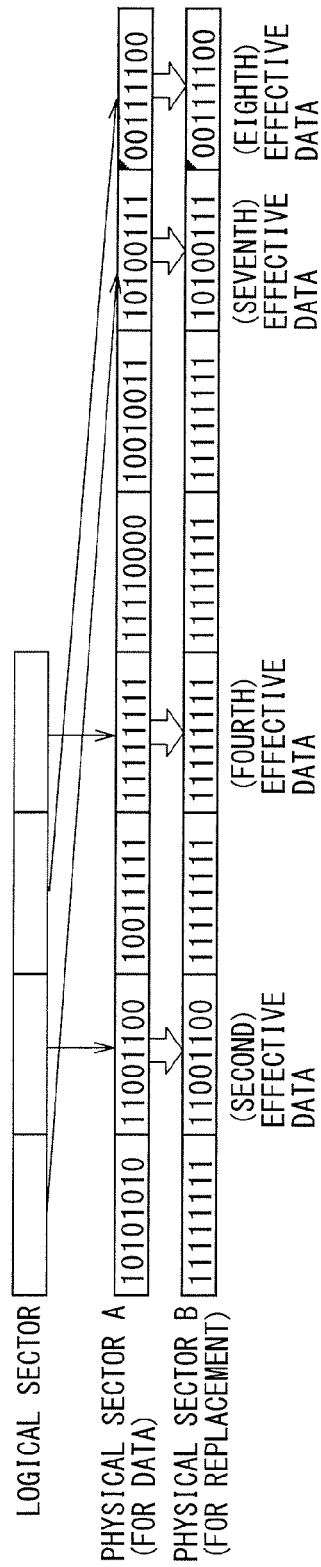
FIG. 4A
FIG. 4B

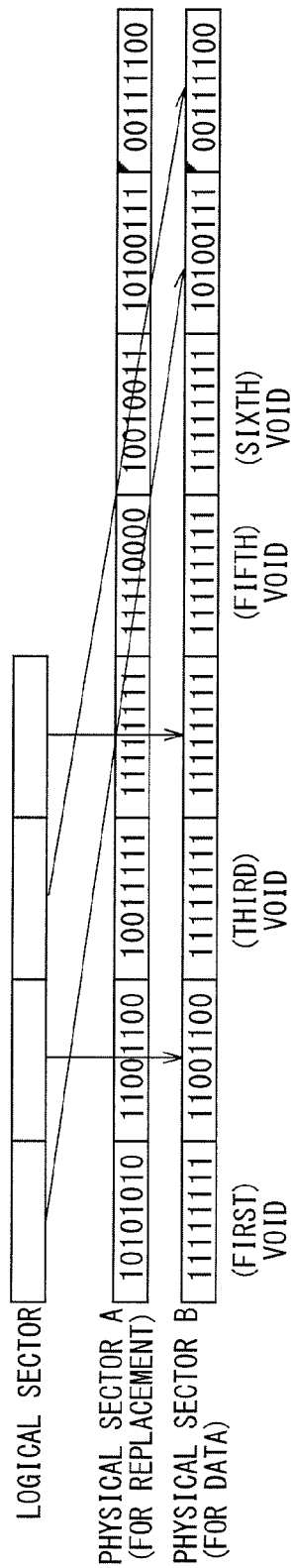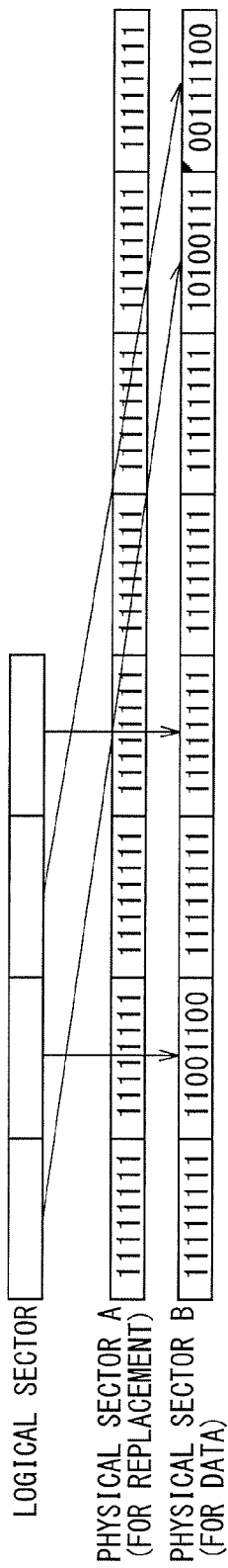

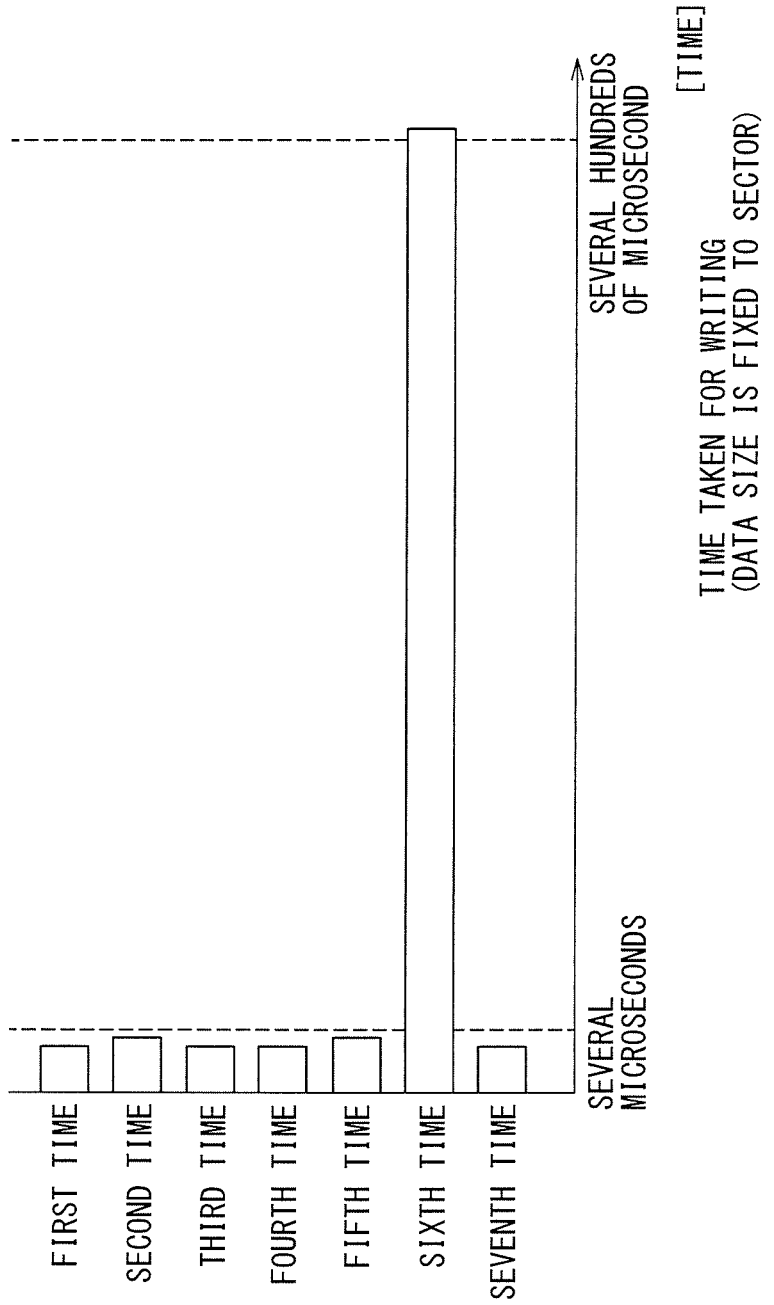

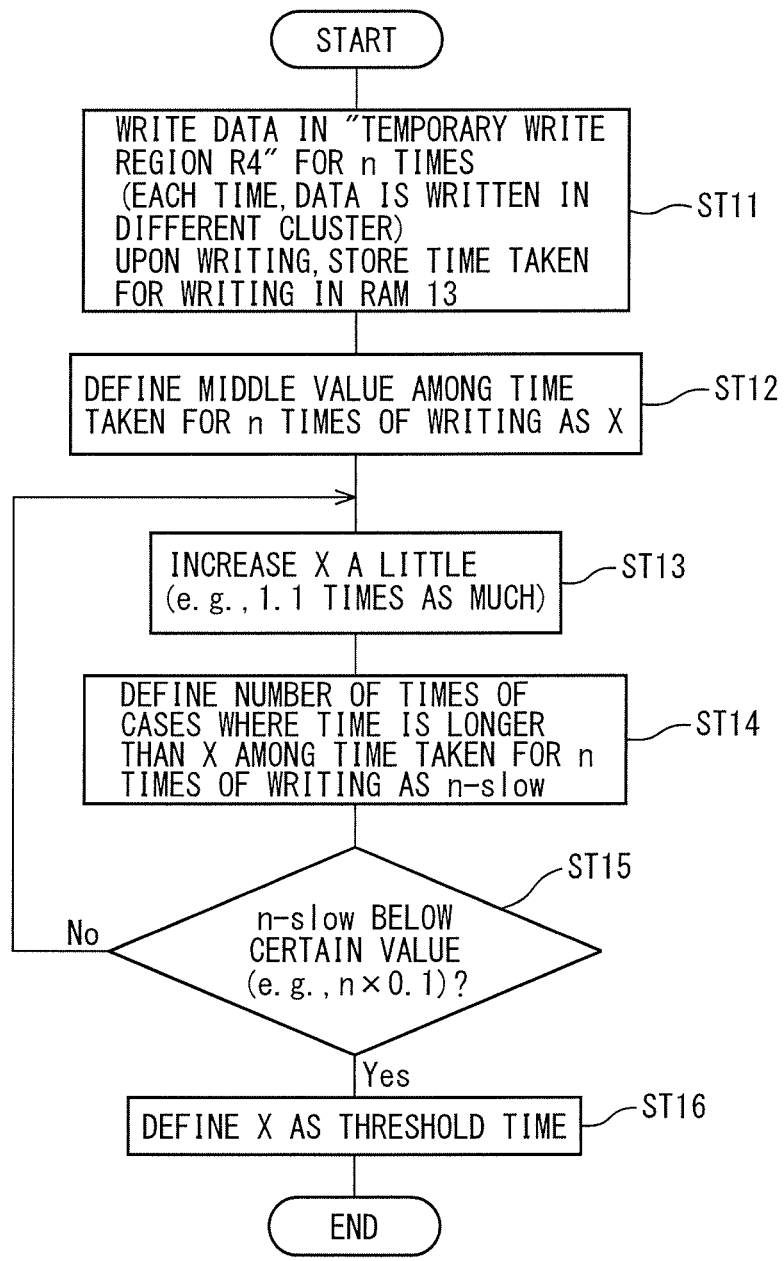

MEMORY CONTROL METHOD, MEMORY CONTROL PROGRAM, AND SEMICONDUCTOR INTEGRATED CIRCUIT DEVICE

CROSS-REFERENCE TO RELATED APPLICATION

This application is based upon and claims the benefit of priority of the prior Japanese Patent Application No. 2014-004365, filed on Jan. 14, 2014, the entire contents of which are incorporated herein by reference.

FIELD

The embodiments discussed herein are related to a memory control method, a memory control program, and a semiconductor integrated circuit device

BACKGROUND

Recently, Flash memory (Flash EEPROM) is used in various kinds of electronic devices including portable devices, such as, digital cameras and smartphones. Flash memory is, for example, a memory (a storage medium, a secondary storage) that takes longer erasure time than data read time and that erases all data before sequentially writing data to a write region.

Meanwhile, for example, a computer (CPU) manages data on a memory in units of files/directories using a FAT (File Allocation Table) file system.

For example, Flash memory such as an SD card (an SD memory card) that is used with a digital camera or a portable device, adopts a FAT file system, whereby the memory (SD card) region is efficiently allocated to files of various different sizes.

As described above, Flash memory such as an SD card that is used with a digital camera or a portable device adopts a FAT file system, whereby the region of the SD card is efficiently allocated to files with various different sizes.

Recently, the storage capacity of Flash memory such as an SD card has remarkably increased with margin so ample that one hardly feels shortage of the capacity. However, for example, write processing to an SD card is often clearly distinguished between cases where write time is long and short.

When write time is long, for example, the write time may take approximately 100 times as long as write time when the write time is short, which is attributable to whether erasure operation of Flash memory occurs inside the SD card upon writing.

In other words, in Flash memory such as an SD card or the like, rewriting from data "1" to data "0" can be carried out as is, while erasure operation is involved for rewriting from data "0" to data "1".

Since the erasure operation takes long time, a large time difference is generated between time that is taken for rewrite processing without erasure operation and time that is taken for rewrite processing with erasure operation. As such, varied write time to a memory causes extension of the completion time of writing a file.

Incidentally, in the past, various proposals have been made for a method of managing a memory (a storage medium, a secondary storage) or a technique of controlling a memory relating to a FAT file system.

Patent Document 1: Japanese Laid-open Patent Publication No. 2006-318366

Patent Document 2: Japanese Laid-open Utility Model Publication No. 2008-117491

Patent Document 3: Japanese Laid-open Patent Publication No. 2009-258921

Patent Document 4: Japanese Laid-open Utility Model Publication No. 2004-213746

SUMMARY

According to an aspect of the embodiments, there is provided a memory control method, which is configured to control data writing to a memory. The memory control method includes securing a temporary write region in the memory; at the time of writing data to the memory, writing to the temporary write region based on a threshold time.

The memory control method includes, when writing to a first portion of the temporary write region has not been completed by a time when the threshold time passed, canceling the writing to the first portion, and writing to a second portion that is different from the first portion of the temporary write region.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3A, FIG. 3B, FIG. 3C, FIG. 3D, and FIG. 3E are diagrams for illustrating an example of rewrite processing of Flash memory (when erasure operation is not involved);

FIG. 4A, FIG. 4B, FIG. 4C, and FIG. 4D are diagrams for illustrating another example of rewrite processing of Flash memory (when erasure operation is involved);

FIG. 5 is a diagram for illustrating write time to a memory card;

FIG. 9 is a flowchart for illustrating an example of threshold time determination processing in a memory control program (the memory control method) according to the embodiment;

DESCRIPTION OF EMBODIMENTS

First, before describing embodiments of a memory control method, a memory control program, and a semiconductor integrated circuit device, there will be described a memory control method of a memory (a storage medium, a secondary storage) adopted in a semiconductor integrated circuit device and problems relating thereto with reference to FIG. 1 to FIG. 5.

For example, when metadata corresponding to image data of a digital camera is stored in a memory such as Flash memory, a plurality of metadata is sequentially written in a predetermined write region according to a FAT (File Allocation Table) file system.

The FAT file system is used, for example, when a computer retains data. The FAT file system is a data structure for managing a secondary storage (a memory, a storage medium), in which data on the memory is managed in units of files/directories.

Further, the FAT file system is mainly intended to efficiently allocate a memory region to, for example, files of various different sizes. To that end, the FAT file system manages a memory, for example, in the following manner.

Figure 1:
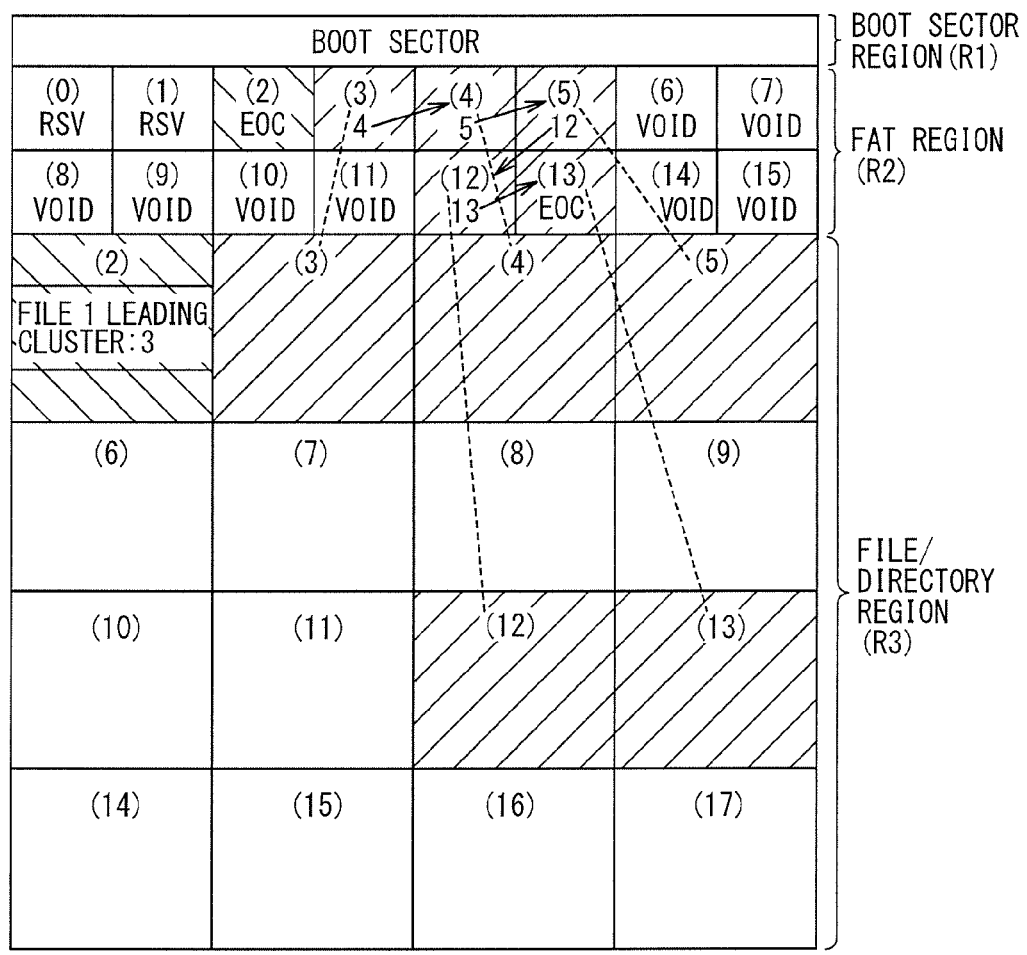
FIG. 1 is a diagram for illustrating an example of a data structure of a memory in a FAT file system.
Figure 2:
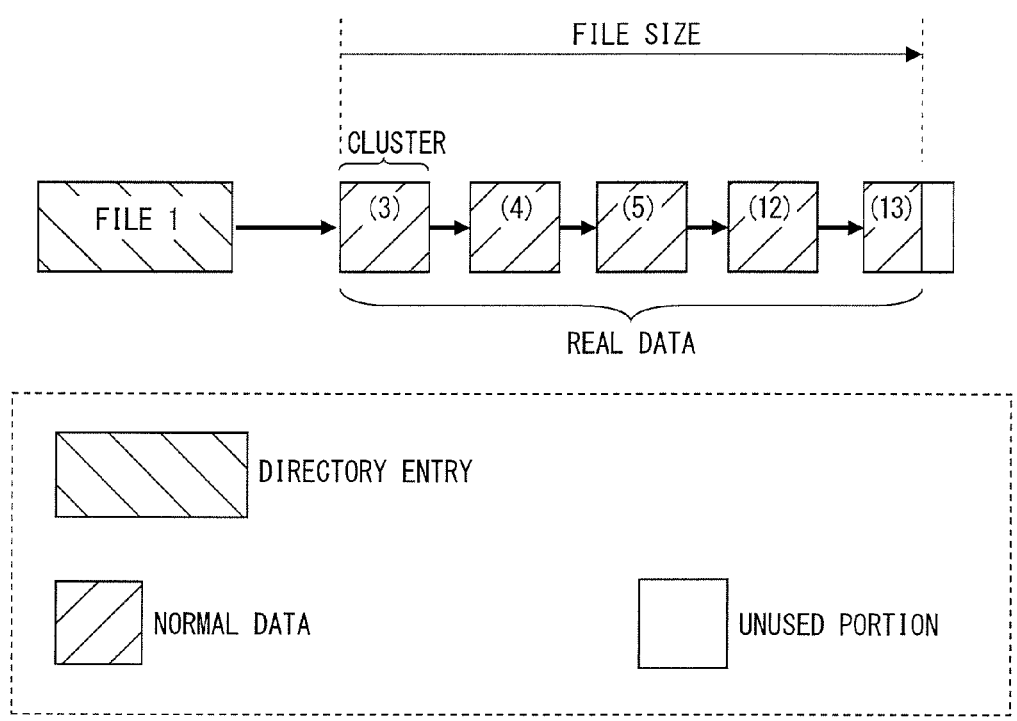
FIG. 2 is a diagram for illustrating a file organization in the data structure depicted in FIG. 1.

FIG. 1 is a diagram for illustrating an example of a data structure of a memory in a FAT file system, depicting an example of a data structure of an SD card (an SD memory card) as an example of Flash memory. FIG. 2 is a diagram for illustrating a file organization in the data structure depicted in FIG. 1.

As depicted in FIG. 1, the data structure (FAT partitions) of the FAT file system of the SD card can be divided, for example, into three regions of "boot sector region (R1)", "FAT region (R2)", and "file/directory region (R3)". Note that a root directory information region (a root directory entry) may be included other than these three regions.

The data on the SD card (the memory) is rewritten, for example, in "sectors" (generally, 512 bytes) as the minimum unit. Further, the file/directory region R3 is managed in units called "clusters" (generally, 512 bytes to 32 KB) that are larger than sectors.

The memory region is allocated to file data in units of clusters. Then, one file data is formed by connecting clusters like a chain. This link structure of clusters is called a "cluster chain". As such, allocation of the memory region can be efficiently performed independently from the position relationship of files and data sizes.

The cluster size (the size of a cluster) is defined as $2^n$ (nth power of 2) times as large as the sector size. Further, while clusters may be the same size as sectors, flexible management is made possible by allowing clusters of different sizes from sectors.

Note that, while the memory region can be efficiently used when the cluster size is small, larger cluster size is more preferable to manage large data, in between which the optimum cluster size is to be adjusted.

In FIG. 1, the boot sector region R1 retains information (memory volume, cluster size, and the like) regarding the whole memory (a storage medium, a secondary storage). The boot sector (the boot sector region R1) is, for example, a region that has the size of one sector to 12 sectors.

The FAT region R2 stores link information of each cluster in the file/directory region R3, including, for example, array format data in which 12-bit, 16-bit, or 32-bit values are arrayed. One FAT entry corresponds to one cluster in a one-to-one relationship.

A value indicating "a cluster number subsequent to a corresponding cluster" is stored as a FAT entry. Note that, when there is no subsequent cluster, a value indicating "EOC (End Of Cluster)" is stored. When a cluster corresponding to a FAT entry is unused, a value indicating "void" is stored.

Further, while the cluster number is defined as starting from a second, the FAT entry starts from a zeroth. As there are no clusters corresponding to the zeroth and first FAT entries, a special value indicating a reserved region "RSV" is set to the zeroth and first FAT entries.

In this way, since the link structure of clusters is managed by "a subsequent cluster number" written in the FAT region R2, which cluster connects to which cluster is changed by rewriting the values in the FAT region R2.

The file/directory region R3 retains "real data" in files and management information called "directory entries". The directory entry includes information regarding one file, for example, a file name and a file size; one file includes real data that are connected in units of clusters starting from a directory entry.

The directory entry is also managed among the clusters. A plurality of directory entries can be stored in the clusters. Further, a particular file that has a directory entry as data may be called a "directory".

Specifically, as depicted in FIG. 1, in the FAT region R2, for example, a special value that indicates "RSV" is set to the zeroth and first FAT entries (0), (1), and a value that indicates "EOC" is stored in the second FAT entry (2).

Further, in the FAT entries (the FAT region R2), for example, clusters (3), (4), (5), (12) store values that indicate subsequent cluster numbers 4, 5, 12, 13. A cluster (13) that does not have subsequent cluster stores a value that indicates "EOC". Note that clusters (6)-(11), (14), (15), of which clusters corresponding to the FAT entries are unused, store a value that indicates "void".

Further, as depicted in FIG. 1 and FIG. 2, one file (file 1) includes real data in which clusters are connected as (3)→(4)→(5)→(12)→(13), led by a directory entry (2) that includes information such as a file name and a file size.

Since the size of the real data (the file size) is smaller than the total size of the five clusters (3), (4), (5), (12), (13), the last cluster (13) includes approximately a third of unused portion (a portion that the real data is not stored). Note that, since the unused portion of the cluster (13) is managed in units of clusters, the unused portion will not be used for storing other files.

Meanwhile, when writing data to a memory (a storage medium, a secondary storage) using Flash memory such as an SD card, it is difficult to freely invert data "0" and data "1". In particular, although rewriting from "1" to "0" can be done bit-by-bit (in units of sectors), rewriting from "0" to "1" is collectively done in units called erasure blocks.

As such, such a memory is hard to be treated in the same way as other storage medium (recording media) such as a magnetic disc that can freely invert "0" and "1", which causes inconvenience. For this reason, the rewriting procedure has been improved to make as if "0" and "1" can be freely inverted.

For example, there is a method of using logical sectors and physical sectors, an example of which processing will be described with reference to FIG. 3A to FIG. 3E and FIG. 4A to FIG. 4D. FIG. 3A to FIG. 3E are diagrams for illustrating an example of rewrite processing of Flash memory (when erasure operation is not involved).

As described above, while, in rewrite processing of Flash memory such as an SD card, rewriting from data "1" to data "0" is possible, rewriting from data "0" to data "1" includes erasure operation (erasure processing).

Note that the data "0" and "1" are used for convenience and the direction may be the other way around. Further, it is to be understood that rewriting of 8 bit data, as will be described below, is only an example, and various cases may be considered.

FIG. 3A depicts an initial state; FIG. 3B depicts a case of rewriting the first sector to data "10101010;" and FIG. 3C depicts a case of rewriting the second sector to data "11001100".

Further, FIG. 3D depicts a case of rewriting the first sector to data "11110000;" and FIG. 3E depicts a case of rewriting the first sector to data "11111100".

First, as depicted in FIG. 3A, in the initial state, for example, all physical sectors are "11111111" (erasure state).

Next, as depicted in FIG. 3B, to rewrite the first sector (logical sector) to data "10101010", the data of the second, fourth, sixth, and eighth bits in order from higher bits are rewritten to "0" in the first physical sector of "11111111". In such a case, since an erasure operation is not necessary, the rewrite processing can be completed in a short time.

Further, as depicted in FIG. 3C, to rewrite the second sector to data "11001100", the data of the second, fourth, seventh, and eighth bits in order from higher bits are rewritten to "0" in the second physical sector of "11111111". Likewise, in this case, since an erasure operation is not necessary, the rewrite processing can be completed in a short time.

Further, as depicted in FIG. 3D, to rewrite the first sector to data "11110000", the first physical sector is hard to be updated since the first physical sector has been written with data "10101010" as described with reference to FIG. 3B.

Thus, for example, data "11110000" is written to an empty fifth physical sector (in an initial state "11111111"). In other words, data of the first to fourth bits in order from higher bits are rewritten to "0". Then, the fifth physical sector is defined as a physical sector corresponding to the first logical sector.

As such, the first sector appears to be rewritten from "10101010" to "11110000" when seen from a user. Likewise, in such a case, since an erasure operation is not necessary, the rewrite processing can be completed in a short time.

Whereas, as depicted in FIG. 3E, to rewrite the first sector to data "11111100", for example, when there is no empty ("11111111") physical sector, write (rewrite) processing is performed only after executing erasure operation. In such a case, the rewrite processing takes long time, since an erasure operation is involved.

FIG. 4A to FIG. 4D are diagrams for illustrating another example of rewrite processing of Flash memory (when erasure operation is involved). FIG. 4A indicates a start state of erasure operation; and FIG. 4B indicates that all the effective data of the physical sector A as an erasure target is copied to the physical sector B for replacement.

Further, FIG. 4C indicates that the roles of the physical sector A and physical sector B are exchanged to make the physical sector B a new sector for data and the physical sector A a new sector for replacement; and FIG. 4D indicates that the physical sector A is erased.

Note that, while, in FIG. 4A to FIG. 4D, one sector for replacement is provided for one sector for data, for example, one sector for replacement may be provided for a plurality of sectors for data (for example, some ten sectors).

First, as depicted in FIG. 4A, the start state of erasure operation corresponds to, for example, when there is no empty physical sector as described with reference to FIG. 3E. In this case, the physical sector B for replacement corresponding to the physical sector A for data is prepared. All the sectors of the physical sector B for replacement are "11111111" (erasure state).

Next, as depicted in FIG. 4B, data of the second, fourth, seventh, and eighth sectors, where effective data is written, of the physical sector A as the erasure target is written into the second, fourth, seventh, and eighth sectors of the physical sector B for replacement.

Further, as depicted in FIG. 4C, the roles of the physical sector A and the physical sector B are exchanged to make the physical sector B a new sector for data and the physical sector A a new sector for replacement.

As such, the effective data is written in the second, fourth, seventh, and eighth sectors in the physical sector B for data, while the first, third, fifth, and sixth sectors remain in empty state.

Therefore, the first, third, fifth and sixth sectors that are empty ("11111111") in the physical sector B for data can be rewritten.

Then, as depicted in FIG. 4D, all the sectors of the physical sector A for replacement are erased to "11111111", preparing for the next time when there is no empty physical sector in the physical sector B for data.

In this way, for example, when there is no empty physical sector as in FIG. 4A, the processing that is described with reference to FIG. 4B, FIG. 4C and FIG. 4D is performed to rewrite empty sectors of the physical sector B for data.

As such, for example, upon writing to a memory card (Flash memory) such as an SD card, there are large differences (variation) in write time between when an erasure operation is not necessary and when an erasure operation is performed.

FIG. 5 is a diagram for illustrating write time to a memory card, which indicates time that is taken for writing when small data of a certain size is repeatedly written to an SD card. Note that the data size of each data to be written in the SD card is a fixed size of one sector.

As depicted in FIG. 5, for example, write processing to an SD card takes approximately several milliseconds for the first to fifth and seventh times, while write processing takes several hundred milliseconds for the sixth time.

This is because the above-described erasure operation is performed in the sixth write processing. The time taken for the sixth write processing reaches approximately 100 times as much as the first to fifth and seventh processing time, in which the erasure operation is unnecessary.

As such, as there is variation in write time to a Flash memory such as an SD card, completion time (response) of writing a file is extended. Whereas, upon writing data to a memory such as an SD card, the writing is preferably completed as soon as possible. In particular, recently, write processing that writes large sized data, especially motion image data, is demanded.

Accordingly, the memory side has been added many improvements to increase the speed. As such, recent high speed SD cards can record HD (High Definition) motion images with a large data amount without dropping frames.

However, although the speed (writing and transferring speed) of sequentially writing data of a certain size, such as motion images, has been significantly increased, for example, write completion time (response) when writing small data, such as metadata, has not necessarily been shortened.

For example, a memory with writing and transferring speed of 20 MB/s can write data of 20 MB in one second, while the same memory can hardly write data of 1 KB in 50 micro seconds (20 thousandth of a second). In fact, write time of data as small as 1 KB is generally approximately several milliseconds.

However, as described above, the write time varies, and sometimes reaches several hundred milliseconds. This is a phenomenon that occurs with a storage medium using Flash memory, such as an SD card, that has been widely used recently. The phenomenon is considered to be caused by an erasure operation of Flash memory upon writing.

When a file is written in a storage medium (Flash memory such as an SD card), not only actual file data but also numerous small management data of the file system is written.

As such, as described above, when write completion time of small data is long, even a file of a small data size takes long time to be written. This means that Flash memory is weak in processing that involves successive writing of many files, such as consecutive photographing.

Extension of time taken for write processing occurs, for example, when there is no empty physical sector for data. The timing (time variation) is difficult to control, for example, possibly causing dropping of frames when a digital camera takes motion pictures.

The following will elaborate the memory control method, the memory control program and the semiconductor integrated circuit device of the embodiments with reference to the appended drawings.

Figure 6:
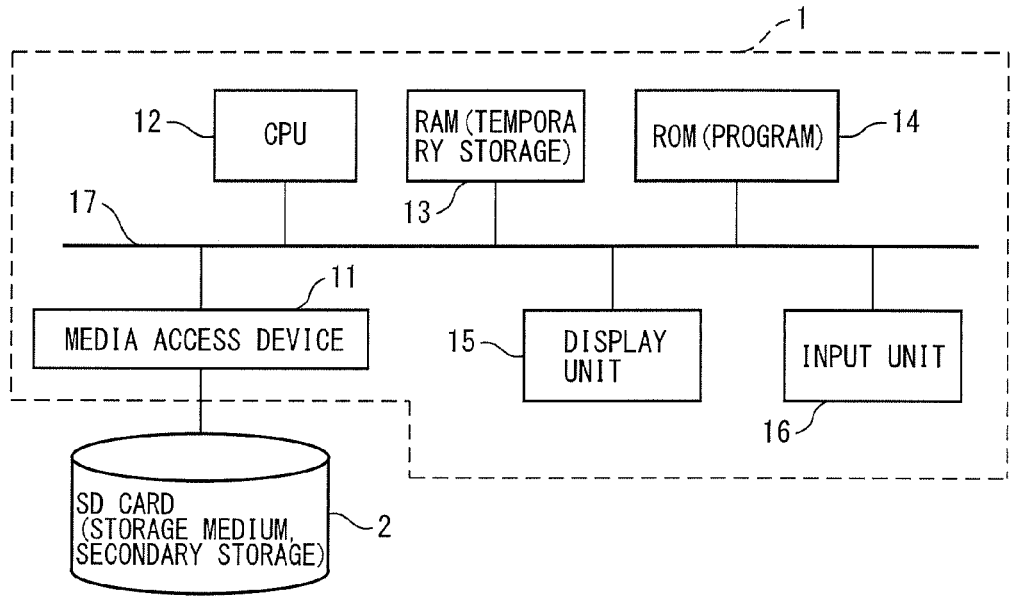
FIG. 6 is a block diagram depicting an example of a hardware configuration of a semiconductor integrated circuit device according to an embodiment.

FIG. 6 is a block diagram depicting an example of a hardware configuration of the semiconductor integrated circuit device according to the embodiment, depicting a configuration example of a digital camera.

As depicted in FIG. 6, the digital camera 1 includes, for example, a media access device 11, a CPU (an arithmetic processing device) 12, a RAM (a first memory) 13, a ROM (a second memory) 14, a display unit 15 and an input unit 16, which are connected through a bus 17.

The media access device 11 is connected to the Flash memory (a storage medium, a secondary storage: an external memory) 2 such as an SD card via a connector (a card slot) that is not depicted, and stores, for example, image data that has been taken, management data, and the like in the memory (an SD card) 2.

The display unit 15 indicates, for example, a liquid crystal display device that displays images being taken or images that have been taken or displays a variety of setting contents. Further, the input unit 16 indicates image condition setting and input from a shutter and a variety of sensors.

The media access device 11, CPU 12, RAM 13, ROM 14, and bus 17 can, for example, integrally form one semiconductor integrated circuit device (LSI).

Note that the memory control program of the embodiment, which will be described later, is stored in the ROM 14 of the semiconductor integrated circuit device, and controls the memory 2 such as an SD card via the media access device 11 by causing the CPU 12 to execute a variety of processing, for example.

Further, the ROM 14 may be a rewritable and non-volatile memory, such as Flash memory, MRAM (magneto-resistance RAM), or FeRAM (ferroelectric RAM). The RAM 13 may also be an MRAM, FeRAM, or the like.

Figure 7:
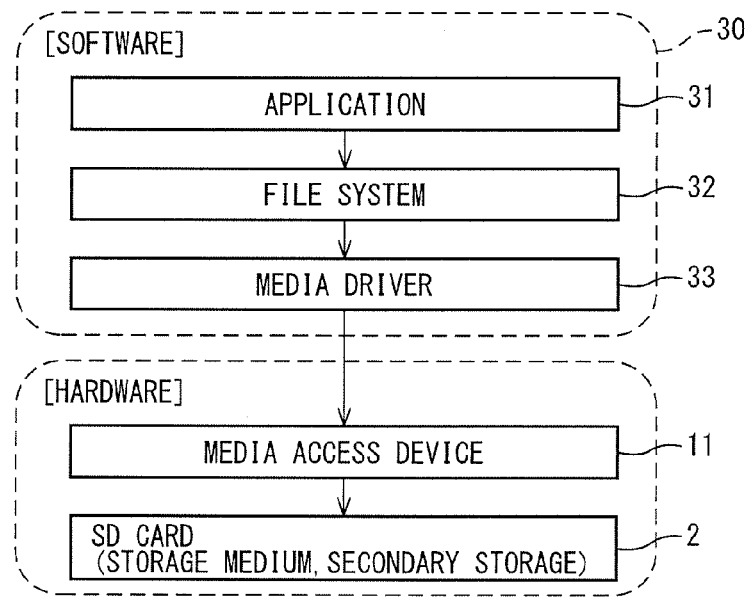
FIG. 7 is a diagram for illustrating an example of a software configuration of a semiconductor integrated circuit device according to the embodiment.

FIG. 7 is a diagram for illustrating an example of a software configuration of the semiconductor integrated circuit device according to the embodiment. As depicted in FIG. 7, the software 30 in the semiconductor integrated circuit device includes, for example, a digital camera application 31, a file system (the FAT file system in the embodiment) 32, and a media driver 33.

The media driver 33 drive-controls the media access device 11 that accesses the memory (Flash memory such as an SD card) 2. Note that the memory 2 that adopts the embodiment is not limited to an SD card, nor limited to Flash memory.

Provided, however, a memory 2 that adopts the embodiment preferably can rewrite data "1" to "0" bit by bit (in units of sectors), yet, collectively execute erasure operation in a predetermined unit when rewriting data "0" to "1". Further, the embodiment may preferably be adopted to a memory 2 which takes a substantially longer time for an erasure operation than time for data rewrite processing (rewriting from "1" to "0").

In this embodiment, there are performed: reserving a temporary write region R4, determining threshold time, writing to the temporary write region R4, reattempting writing to the temporary write region R4, as well as writing back from the temporary write region R4.

Figure 8A:
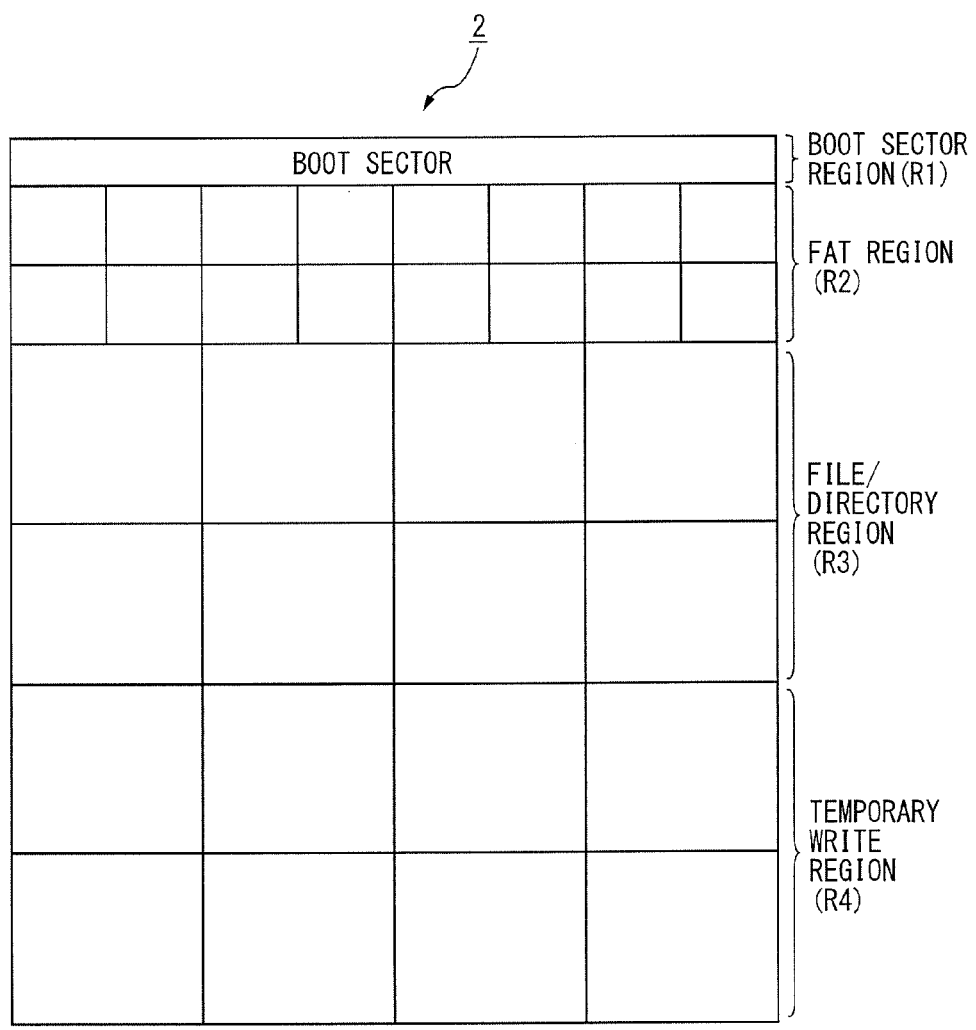
FIG. 8A and FIG. 8B are diagrams for illustrating a data structure example of a memory that adopts a memory control method according to the embodiment.
Figure 8B:
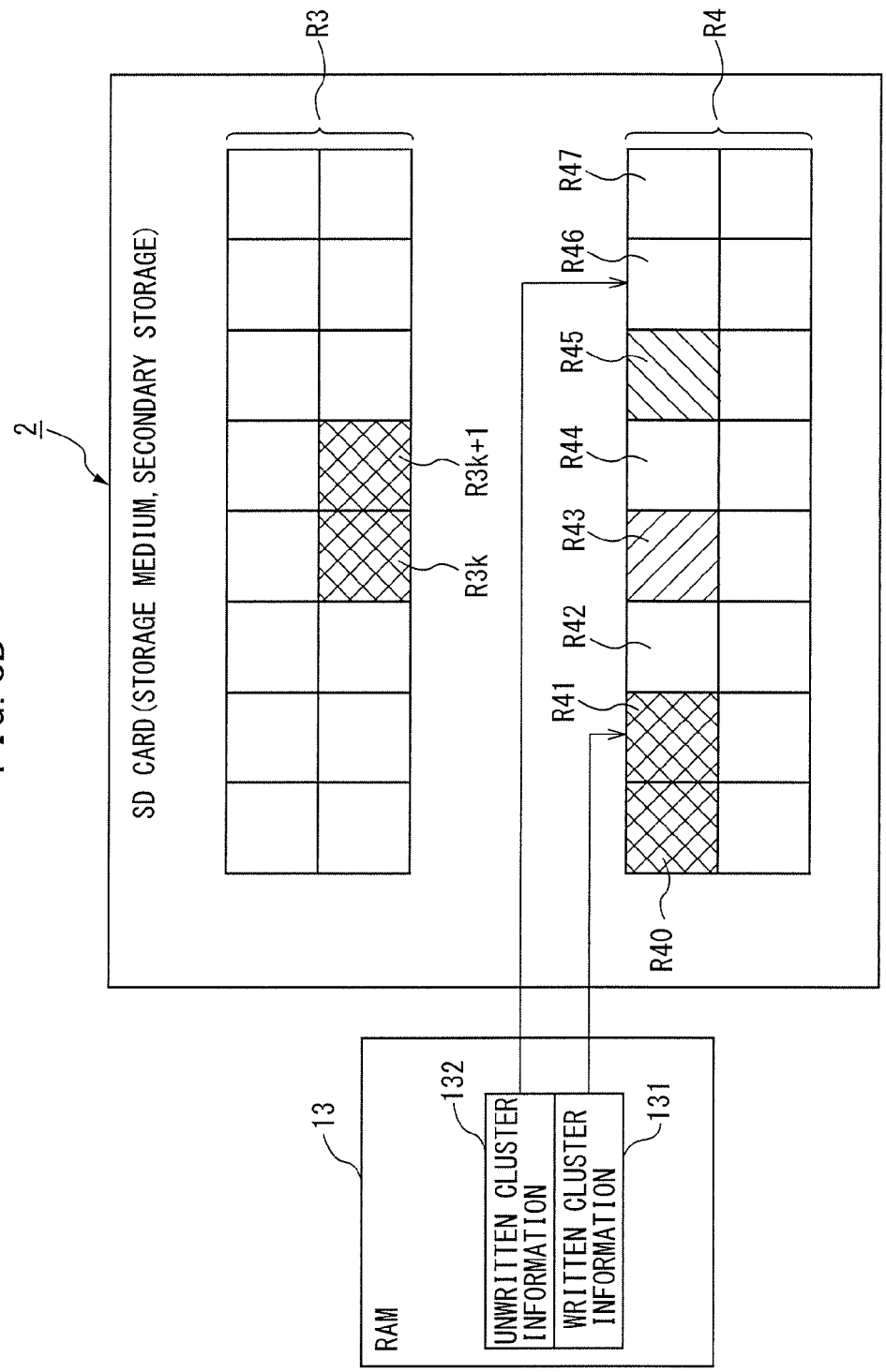

First, with reference to FIG. 8A and FIG. 8B, reserving of the temporary write region R4 will be described. FIG. 8A and FIG. 8B are diagrams for illustrating a data structure example of a memory that adopts the memory control method according to the embodiment.

As can be seen from the comparison of FIG. 8A and above-described FIG. 1, in the data structure of the memory 2 that adopts the memory control method according to the embodiment, a "temporary write region (R4)" is added to the data structure of the memory of the FAT file system as described with reference to FIG. 1. The temporary write region R4 is managed in units of clusters, for example, in the same way as the file/directory region R3.

Note that, while, in FIG. 8A, the temporary write region R4 is secured outside the file/directory region R3 (separately from R3), the temporary write region R4 may be included in the file/directory region R3. In such a case, a special file is prepared, of which real data is used as the temporary write region R4.

Specifically, when the memory 2 is Flash memory that has 32 GB capacity, for example, a half, 16 GB, is formatted as a boot sector region R1, a FAT region R2, and a file/directory region R3, and the remaining 16 GB can be a temporary write region R4.

Alternatively, for example, the whole 32 GB can be formatted as a boot sector region R1, a FAT region R2, and a file/directory region R3, and a temporary write region R4 may be provided in the file/directory region R3.

As depicted in FIG. 8B, for example, to manage the temporary write region R4, the RAM 13 of the semiconductor integrated circuit device stores written cluster (portion) information 131 and unwritten cluster (portion) information 132.

The written cluster information 131 is, for example, information of a cluster number of a cluster that initially had an initial state (erasure state) "11111111" and has been written with data ("0"). The unwritten cluster information 132 is information of a cluster number that is "11111111" to which data ("0") has not yet been written.

Note that, the smallest cluster number among the temporary write region R4 is set as the initial value of the cluster number of each written cluster information 131 and unwritten cluster information 132.

Then, each time the temporary write region R4 is written, the cluster number of the unwritten cluster information 132 is incremented by one. Further, each time data is written back from the temporary write region R4 to the file/directory region R3, the cluster number of the written cluster information 131 is incremented by one.

In this way, part of the memory (an SD card) is reserved as the temporary write region R4. Note that the temporary write region R4 can be acquired by a variety of approaches without particular restriction. Provided, however, as will be described later in detail, a sufficiently large region is preferably secured for the temporary write region R4 as reattempting (renewing the write processing) is to be performed when threshold time has passed.

FIG. 8B depicts, for example, that data that was temporarily written in clusters R40, R41 of the temporary write region R4 is processed by data write back processing, as will be described with reference to FIG. 12, and written back to clusters R3$k$, R3$k$+1 of the original file/directory region R3.

Further, in FIG. 8B, for example, clusters R43 and R45 of the temporary write region R4 indicate portions where writing to the temporary write region R4, as will be described with reference to FIG. 10, has been completed by the time when threshold time x has passed and the data has been written. Provided, however, data write back processing to the file/directory region R3 has not been performed.

Further, in FIG. 8B, for example, clusters R42 and R44 of the temporary write region R4 indicate portions where writing to the temporary write region R4, as will be described with reference to FIG. 10, has not been completed by the time when threshold time x has passed and the writing has been cancelled.

Next, with reference to FIG. 9, determination of threshold time will be described. FIG. 9 is a flowchart for illustrating an example of threshold time determination processing in a memory control program (the memory control method) according to the embodiment.

The threshold time determination processing is, for example, upon starting using a memory (an SD card), for attempting writing for a plurality of times, analyzing variation in the write time, and determining threshold time (x) for distinguishing cases of short and long write time.

Note that the threshold time determination processing is performed as initialization processing for using an SD card 2, for example, when the SD card 2 is inserted into the card slot of a digital camera or when the power of the digital camera to which the SD card 2 was inserted in advance is turned on.

In other words, determination of threshold time x can be performed when the memory 2 is connected to a device that uses the memory 2 or when the power of a device to which the memory 2 is connected is turned on.

As depicted in FIG. 9, when threshold time determination processing starts, at step ST11, data is written to the "temporary write region R4" for n times (for example, some 100 times) and, while writing, time that was taken for writing is recorded in the RAM 13. In the n times of writing of data to the temporary write region R4, each write processing is performed to a different target cluster.

Further, proceeding to step ST12, the middle value (for example, 50th value) among time that is taken for writing for n times is defined as x. Further, proceeding to step ST13, x is increased a little (for example, 1.1 times as much).

In other words, as described with reference to FIG. 5, for example, when a long time is required for writing due to an erasure operation, the time is considered to be longer than the 50th (the middle) among time of 100 times of data writing. Thus, x starts from a smaller value (short threshold time), increasing little by little (1.1 times as much).

Then, proceeding to step ST14, the number of times when time is taken longer than x among n times of writing is defined as n-slow. Further, proceeding to step ST15, whether n-slow is below a certain value (for example, n×0.1) is determined.

At step ST15, when n-slow is determined as not being below the certain value (n-slow≥n×0.1), then, returning to step ST13, the processing of above-described steps ST13 to ST15 is repeated.

On the other hand, at step ST15, when n-slow is determined as being below the certain value (n-slow<n×0.1), then, proceeding to step ST16, the threshold time determination processing terminates with x as the threshold time.

Specifically, for example, when n=100 and n-slow is below ten, in other words, time that is taken long for writing due to erasure operation is less than 10 times out of 100 times, the threshold time in this case is determined as x. Note that the determined threshold time x is retained, for example, while the digital camera is on.

Since the threshold time x is a smaller value (short time), the reattempting costs of writing becomes smaller. However, too small threshold time causes erroneous judgment of "a case where writing ends quickly", leading to longer write time.

On the other hand, since the threshold time x is a larger value (long time), the reattempting costs of writing becomes larger. However, too large a threshold time diminishes the effect of adopting this embodiment. Thus, the threshold time x is preferably set to a smaller value within a range where "a case where writing ends quickly" is erroneously judged as little as possible.

Note that, in the processing depicted in FIG. 9, n=100, 1.1 times, n×0.1 and the like are only examples, which may be set to a variety of values. Further, it is to be understood that determination processing of threshold time x is not restricted to that described with reference to FIG. 9.

Figure 10:
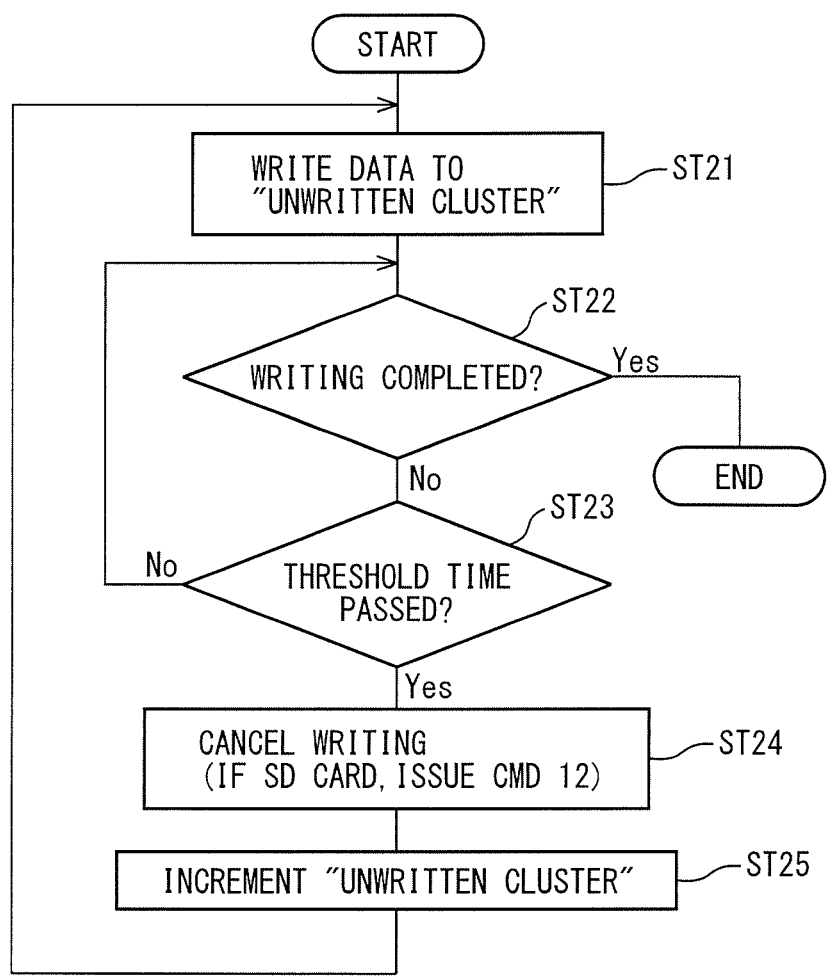
FIG. 10 is a flowchart for illustrating an example of data write processing in the memory control program according to the embodiment.

With reference to FIG. 10, writing to the temporary write region R4 and reattempting (renewing the write processing) of writing to the temporary write region R4 will be described. FIG. 10 is a flowchart for illustrating an example of data write processing in a memory control program according to the embodiment.

Write processing to the temporary write region R4 is, for example, when writing metadata, writing to the temporary write region R4 once, instead of writing directly to the target region.

Further, reattempting of writing to the temporary write region R4 is, when writing to the temporary write region R4, when writing has not been completed by the time when the determined threshold time (x) has passed, canceling the writing and writing again to another place (cluster) of the temporary write region R4. This process is repeated until a place is found where the writing is completed within threshold time x.

As depicted in FIG. 10, once data write processing starts, at step ST21, data is written to the "unwritten cluster" of the temporary write region R4. Proceeding to step ST22, whether writing is completed or not is determined.

At step ST22, when writing is determined as completed, the data write processing terminates, while, when writing is determined as not completed, then, proceeding to step ST23, whether threshold time x has passed is determined. The portion (cluster) for which is determined that writing to the temporary write region R4 is completed at step ST22 corresponds to, for example, clusters R43, R45 of FIG. 8B.

When threshold time x is determined as having passed at step ST23, then, proceeding to step ST24, the writing is cancelled, and, the processing proceeds to step ST25. Specifically, for example, an SD card is used, a command CMD12 is issued to cancel writing. At step ST24, the portion where the writing is cancelled corresponds to, for example, clusters R42, R44 of FIG. 8B.

At step ST25, the "unwritten cluster" in the temporary write region R4 is incremented by one, the processing returns to step ST21, and the same processing is repeated. Further, when threshold time x is determined as having not passed at step ST23, returning to step ST22, the same processing is repeated.

Figure 11:
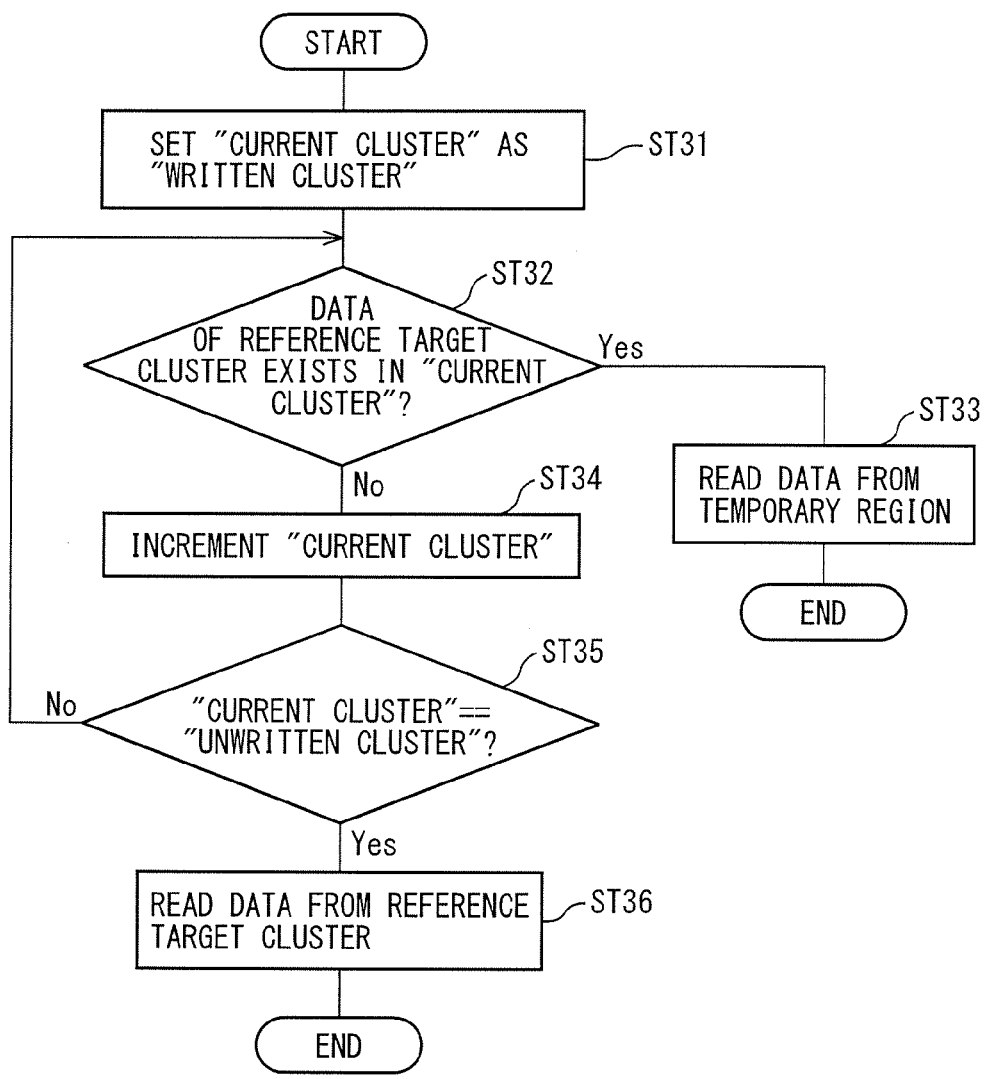
FIG. 11 is a flowchart for illustrating an example of data reference processing in the memory control program according to the embodiment.

FIG. 11 is a flowchart for illustrating an example of data reference processing in a memory control program according to the embodiment. The data reference processing corresponds to, for example, a digital camera is used, processing of when displaying image data stored in an SD card 2 on the display unit 15 of the digital camera, or when transferring the image data to a personal computer, a television receiver, or the like to which the digital camera is connected.

As depicted in FIG. 11, when the data reference processing starts, at step ST31, a "current cluster" is set as a "written cluster". Proceeding to step ST32, whether data of the reference target cluster exists in the "current cluster" is determined.

At step ST32, when the data of the reference target cluster is determined as existing in the "current cluster", the processing proceeds to step ST33, in which the data is read from the temporary region and the processing terminates.

Whereas, when the data of the reference target cluster is determined as not existing in the "current cluster" at step ST32, the "current cluster" is incremented by one at step ST34. Then, proceeding to step ST35, whether the "current cluster" is an "unwritten cluster" is determined.

At step ST35, when the "current cluster" is determined as an "unwritten cluster", the processing proceeds to step ST36, in which data is read from the reference target cluster and the processing terminates. At step ST35, when the "current cluster" is determined as not an "unwritten cluster", the processing returns to step ST32, and the same processing is repeated.

Figure 12:
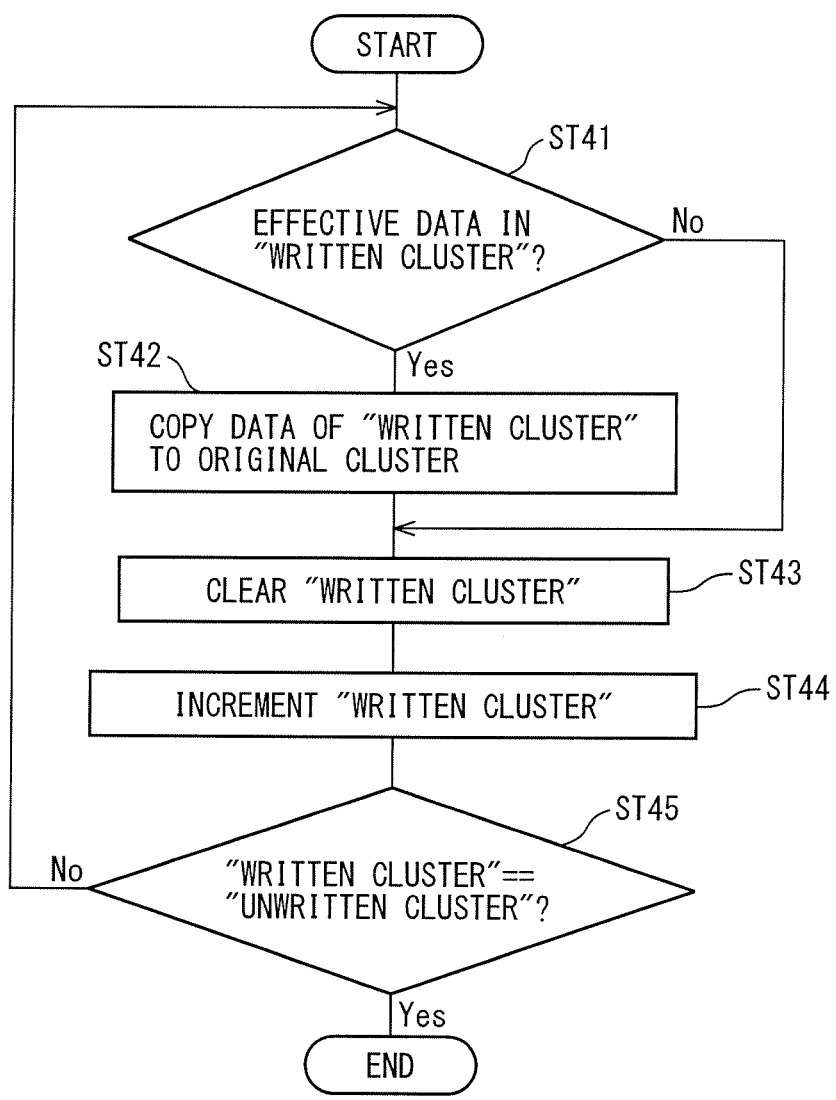
FIG. 12 is a flowchart for illustrating an example of data write back processing in the memory control program according to the embodiment.

Referring to FIG. 12, writing back from the temporary write region R4 will be described. FIG. 12 is a flowchart for illustrating an example of data write back processing in the memory control program according to the embodiment.

In write back processing from the temporary write region R4, data is written back to the original write target region after writing to the temporary write region R4 is completed. Once writing to the temporary write region R4 is completed, the written data is retained even after the power is turned off, and thus the data write back processing does not have to be performed in haste.

As depicted in FIG. 12, when data write back processing starts, at step ST41, whether effective data exists in the "written cluster" is determined. Thus, the written cluster information 131 stored in the RAM 13 is referred to for determination.

When effective data is determined as existing at step ST41, the processing proceeds to step ST42, in which data of the "written cluster" is copied to the original cluster, and the processing proceeds to step ST43.

The data copy processing at step ST42, for example, corresponds to the processing of writing back data that was temporarily written in clusters R40, R41 of the temporary write region R4 of FIG. 8B to clusters R3k, R3k+1 of the original file/directory region R3.

When effective data is determined as not existing in the "written cluster" at step ST41, the processing proceeds directly to step ST43. At step ST43, the "written cluster" is cleared, further proceeding to step ST44, the "written cluster" is incremented by one. At step ST45, whether the "written cluster" is an "unwritten cluster" is determined.

Determination of whether the "written cluster" is an "unwritten cluster" is performed by referring to the written cluster information 131 and unwritten cluster information 132 stored in the RAM 13.

At step ST45, when the "written cluster" is determined as an "unwritten cluster", the data write back processing terminates, while, when the "written cluster" is determined as not an "unwritten cluster", returning to step ST41, the same processing is repeated.

In this way, after writing of data to the temporary write region R4 is completed, the data written in the temporary write region R4 is written back to the original region.

As such, according to the embodiment, for example, completion time of writing a file can be shortened while avoiding influences from variation of write time to a secondary storage (a storage medium, a memory) that uses Flash memory such as an SD card. Therefore, for example, in consecutive photographing by a digital camera, processing of successively writing many files can be performed at high speed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations can be made hereto without departing from the spirit and scope of the invention.

What is claimed is:

1. A memory control method configured to control data writing to a memory, comprising:
   securing a temporary write region in the memory;
   at the time of writing data to the memory, writing to the temporary write region based on a threshold time;
   when writing to a first portion of the temporary write region has not been completed by a time when the threshold time passed, canceling the writing to the first portion, and writing to a second portion that is different from the first portion of the temporary write region.

2. The memory control method as claimed in claim 1, wherein
   the threshold time is determined by attempting to write to the temporary write region for a plurality of times and analyzing variation in write time.

3. The memory control method as claimed in claim 2, wherein
   determination of the threshold time is performed as initialization processing for using the memory.

4. The memory control method as claimed in claim 2, wherein
   determination of the threshold time is performed when the memory is connected to a device that uses the memory or when a power of a device connected to the memory is turned on.

5. The memory control method as claimed in claim 1, wherein
   the temporary write region is secured separately from a file/directory region provided in the memory.

6. The memory control method as claimed in claim 1, wherein the temporary write region is included in a file/directory region provided in the memory.

7. The memory control method as claimed in claim 1, wherein data written in the temporary write region is written back to a file/directory region provided in the memory.

8. The memory control method as claimed in claim 1, wherein the memory is a storage medium that takes longer erasure time in comparison to data read time and performs erasure operation for rewriting from a first data to a second data.

9. The memory control method as claimed in claim 1, wherein the memory is Flash memory.

10. The memory control method as claimed in claim 9, wherein the memory is an SD card.

11. A computer readable recording medium for storing a memory control program of controlling data writing to a memory, the program causing an arithmetic processing device to execute:

securing a temporary write region in the memory;

at the time of writing data to the memory, writing to the temporary write region based on a threshold time;

when writing to a first portion of the temporary write region has not been completed by a time when the threshold time passed, canceling the writing to the first portion, and writing to a second portion that is different from the first portion of the temporary write region.

12. The computer readable recording medium as claimed in claim 11, the memory control program further causing the arithmetic processing device to execute:

determining the threshold time by attempting writing to the temporary write region for a plurality of times and analyzing variation in write time.

13. A semiconductor integrated circuit device comprising an arithmetic processing device; a first memory as a temporary storage; a second memory that stores a program; and a media access device that controls access to an external memory to which data is written, wherein the arithmetic processing device, via the media access device:

secures a temporary write region in the external memory;

at the time of writing data to the external memory, writes to the temporary write region based on threshold time; and when writing to a first portion of the temporary write region has not been completed by time when the threshold time passed, cancels the writing to the first portion, and writes to a second portion that is different from the first portion of the temporary write region.

14. The semiconductor integrated circuit device as claimed in claim 13, wherein the arithmetic processing device, via the media access device, determines the threshold time by attempting writing to the temporary write region for a plurality of times and analyzing variation in write time.

15. The semiconductor integrated circuit device as claimed in claim 13, wherein the first memory stores information of a written portion of the temporary write region and information of an unwritten portion thereof.

* * * * *